2,962,577

ELECTRICAL DISCHARGE MACHINING METHOD

Robert S. Webb, Franklin, Mich., assignor to Elox Corporation of Michigan, Royal Oak, Mich., a corporation of Michigan No Drawing. Filed Feb. 9, 1959, Ser. No. 791,788

3 Claims. (Cl. 219—69)

This invention relates to electrical-discharge machining, sometimes called "electro-spark machining," "electro-erosion machining," etc. It relates particularly to improvements in rate of metal removal when machining with electrical-discharge apparatus as a result of the use of improved electrode and coolant materials.

As is well known in the art, electrical-discharge machining is carried on by passing a series of short duration, high frequency, electrical discharges across a gap from an electrode to a conductive workpiece in the presence of a dielectric coolant.

The primary object of this invention is to effect an improvement in the rate of metal removal by utilizing an improved electrode in the presence of an improved coolant.

Study of electrical-discharge-machining phenomena has revealed that, even with an electrode of very small cross-sectional area, discharges occur between the workpiece and different areas of the electrode as the machining progresses. Several discharges may take place between the same areas of workpiece and electrode, the discharge path may then move to a remote spot on the electrode face, then to another spot, etc. In other words, a single discharge never takes place over the entire face of the electrode, but represents a continuously moving point on the electrode with each successive discharge. This is because of the variable dielectric of the gap caused by erosion of the workpiece and electrode, accumulation of sludge in the gap, non-uniformity of coolant dielectric strength, etc.

Furthermore, it has been found that concentration of the area of discharge, both on the electrode and on the workpiece, at a given energy level, results in a higher metal removal rate. Putting it another way, it has been determined that narrowing of the area on the electrode face from which the discharge takes place will improve the machining rate; and if the discharge is prevented from "fanning out" and is concentrated on a narrow area of the workpiece, a greater improvement in metal removal rate is achieved.

This may be demonstrated by reference to the following equations:

$$W = I^2 R$$

where W represents the power in watts passed across the gap, I the current and R the resistance.

$$R = \frac{PL}{A}$$

where the resistance R of an element is equal to the resistivity P times the length L divided by the area.

Solving algebraically, $$W = \frac{I^2 PL}{A}$$

The area A in this case represents the area of the pit mark in the electrode from which a particular discharge emanates. It is thus apparent that as the area is decreased for a given current, the wattage dissipation increases in the electrode thus effecting an overall increase in efficiency, inasmuch as the wattage dissipated represents stock removed from the workpiece.

It is thus apparent that the smaller the electrode area of discharge the greater the machining efficiency; and if the discharge can be narrowed as it reaches the workpiece or at least prevented from fanning out, a further improvement will result.

Additional experimentation reveals that metal removal as effected on the workpiece is caused by more than one factor of which vaporization of a portion of the metal is a strong contributing part, but not the sole method of metal removal. If metal removal were exclusively a function of pit mark diameter then it would be logical to assume that an electrode and workpiece of the same composition would have a higher electrode wear in that the pit mark is in most cases smaller on the electrode than it is on the workpiece, thus representing a higher metal removal efficiency on the electrode than the workpiece. Empirical testing reveals that this is not the case but rather that use of the same material as an electrode and workpiece will cause an electrode wear of approximately two to one, that is, two parts of workpiece removed to one part of electrode. From this, it is apparent that vaporization is only a part of the overall picture of metal removal but that diameter of pit mark is irrevocably tied in to metal removal. This is further substantiated in the high metal removal coolant in that the increased metal removal is effected on the workpiece only and not on the electrode. That is, for a standard power supply having a workpiece removal rate of .6 of a cubic inch per hour, the brass electrode removal rate is also approximately .6 of a cubic inch per hour. In the high metal rate coolant, the electrode removal or wear remains at .6 of a cubic inch per hour and the workpiece metal removal increases by a factor of 2 to 1.2 cubic inches per hour, thus indicating no volumetric increased electrode removal and a resulting improvement in electrode wear as well in this coolant.

Consider next, the high metal removal rate electrode material and the theory behind this high metal removal rate. As previously mentioned, the apparent cause of this high metal removal rate is the smaller electrode diameter pit mark reflecting correspondingly a smaller workpiece pit mark. This may be considered as an availability of electrons per unit area on the surface of the electrode. In other words, an electrode or cathode material having the highest area density of electrons tends to produce the most concentrated discharge. This may be shown by considering an electrode having small diameter molecules with numerous ionizable electrons in the outer or available orbit. This may be compared to an electrode having relatively large diameter molecules and a correspondingly low molecular density with fewer available electrons in the outer or ionizable orbit. Below is a chart of several electrode materials, the two key values in this chart being shown as vertical column 4 atomic density and vertical column 6 chemical valence density. Note that column 4 atomic density is determined by dividing the mass density of a given element or electrode material by its corresponding atomic weight or for the first one shown, namely, aluminum having a mass density of 2.7 grams per cubic centimeter, divided by its corresponding atomic weight of 27 yields a ratio of atomic density of .1. This is a method of comparison of atomic density and, as such, is not a valid unit. The numbers formed by this ratio, however, are a definite indication or ratio of the atomic density of any given elements—for example, aluminum having an atomic density of .1 as compared to carbon graphite, having an atomic density of .187 would indicate that carbon graphite has an atomic density approximately 1.87 times that of aluminum. This same comparison may be made with any of the other electrode materials. Thus, the small diameter molecule or atom referred to in the case of an electrode is one of these elements having a high molecular density representing correspondingly small diameter atoms. The second important factor to be considered is the available or ionizable electrons in the outer orbits of the corresponding atom; thus, aluminum has a chemical valence of 3, indicating 3 available electrons, and carbon or graphite has a valence of 4, indicating 4 available electrons. The product of atomic density times valence is an indication of the ratio of actual ion or electron density. This is shown as vertical column 6 and is called "chemical valence density," and is the key to electrode construction; note that with the exception of carbon or Carbone CG–4, the ion or chemical valence density of all other electrode materials is approximately the same and correspondingly their electrode metal removal rate is also approximately the same. The outstanding feature is that graphite having an ion density ratio of .750 is approximately three times higher than any of the other useable materials—for example, copper, having an ion density of .282. Correspondingly, per unit of current the metal removal efficiency of graphite as an electrode material is exactly three times higher as an electrode material the corresponding cathode spot would be approximately three times smaller. This smaller cathode area and reflected workpiece area representing a more concentrated energy level having a higher power dissipation as indicated by the above equation, is a key to at least a portion of the overall increase in metal removal rate per unit of energy.

It seems clear therefore that with a given power transfer across an EDM gap, the highest machining rate will be obtained by use of an electrode material having relatively high ionic density together with a coolant having the characteristic of concentrating and confining the discharge to a narrow path.

From the above chart, it appears the "Carbone CG4," a product of the Carbone Corporation, is the most satisfactory electrode material found so far. It is a sintered product comprising 78% copper and 22% carbon.

I have found the most satisfactory coolant for use with this electrode material to be di-methyl siloxane silicone oil of a kinematic viscosity in the range of from 20 to 50 centistokes. This compound may be obtained commercially from Dow Corning Corporation.

It is my opinion that the ability of this oil to concentrate the discharge is due to its relatively great number of available basic methane ions.

The high molecular density provides a high concentration of methyl ions in the vicinity or path of the discharge, and these ions are available as carriers for the electron stream. Other compounds, such as methyl ester stearic acid, have somewhat comparable molecular structures with high availability of methyl ions and high boiling points and will provide increased machining rate when used as EDM coolant.

I claim:

1. The process of electrical-discharge-machining which comprises, passing intermittent, high frequency, short duration electrical discharges across a gap to a workpiece from an electrode of electrically conductive material having an ionic density greater than .4 in the presence of a coolant having relatively high methyl group density.

2. The process of claim 1 wherein the electrode has a carbon content in excess of 20% and the coolant consists essentially of di-methyl siloxane fluid.

3. The process of claim 1 wherein the electrode has a carbon content in excess of 20% and the coolant consists essentially of methyl stearate.

| Electrode Material | Density, Grams/CC. | Atomic weight | Atomic Density, Density/At. Wt. | Valence | Chemical Valence Density | Ion Potential, Volts | Work Function, Elect. Volts | Resistivity, Micro Ohm-C.M. |
|---|---|---|---|---|---|---|---|---|
| 1 | 2 | 3 | 4 | 5 | 6 | 7 | 8 | 9 |
| Aluminum | 2.70 | 27 | 0.100 | 3 | 0.300 | 5.96 | 3.4 | 2.82 |
| Carbon Graphite | 2.25 | 12 | 0.187 | 4 | 0.750 | 11.2 | 4.6 | 8.00 |
| Chrome | 6.92 | 52 | 0.133 | 2 | 0.266 | 6.74 | 4.6 | 13.0 |
| Copper | 8.90 | 63 | 0.141 | 2 | 0.282 | 7.68 | 4.2 | 1.7 |
| Tungsten | 18.9 | 184 | 0.103 | 2 | 0.206 | 8.1 | 4.4 | 7.0 |
| Zinc | 7.16 | 65 | 0.111 | 2 | 0.222 | 9.36 | 3.4 | 8.0 |
| Carbone CG4 | 4.5 |  | 0.16 | 3 | 0.48 |  |  |  |
| Silicon | 2.42 | 28 | .0865 | 4 | 0.346 | 8.4 | 4.6 | 58.0 |

References Cited in the file of this patent

UNITED STATES PATENTS 2,766,364    Higgins et al.    Oct. 9, 1956
2,798,934    Bruma    July 9, 1957